United States Patent [19]

Huckaby

[11] Patent Number: 4,618,378
[45] Date of Patent: Oct. 21, 1986

[54] PIPE CUTTING TEMPLET

[75] Inventor: James E. Huckaby, Tatum, N. Mex.

[73] Assignee: Shuf-Kut, Inc., Tatum, N. Mex.

[21] Appl. No.: 755,942

[22] Filed: Jul. 16, 1985

[51] Int. Cl.⁴ .............................................. B23K 7/10
[52] U.S. Cl. ...................................... 148/9.6; 266/54; 266/64
[58] Field of Search ................. 266/54, 64; 148/9, 9.6

[56] References Cited

U.S. PATENT DOCUMENTS

| 3,417,477 | 12/1968 | Nowotny | 266/64 |
| 3,417,979 | 12/1968 | Cable | 266/64 |
| 4,381,854 | 5/1983 | Bruner | 266/54 |
| 4,414,041 | 11/1983 | Rusk | 266/54 |

Primary Examiner—Wayland Stallard
Attorney, Agent, or Firm—Wendell Coffee

[57] ABSTRACT

A templet for cutting patterns in pipe with a torch includes a tube that is axially split into hemicylindrical segments. The segments are biased together in alignment with a coil spring. The segments are spread apart by squeezing attached handles together. A wide flat face transverse the tube wall at each tube end, defines a pattern. The flat face is formed by the tube wall and a coextensive flange. The tube covers and protects portions of the pipe to be retained and exposes the portion to be cut away. To make a cut, a flat-sided collar near the torch tip is positioned flush against the flat face. The flat face is angled to the tube wall so that a cutting axis of the torch will be oriented at a desired angle to a pipe telescoped within the tube. As the torch is moved along the flat face from a centered position where the cutting axis is radial of the tube axis, the flat side of the torch collar is maintained flush against the flat face, and the cutting axis is maintained parallel to that of the center torch position. Thus, the cut is made accurately with simple continuous motions.

15 Claims, 8 Drawing Figures

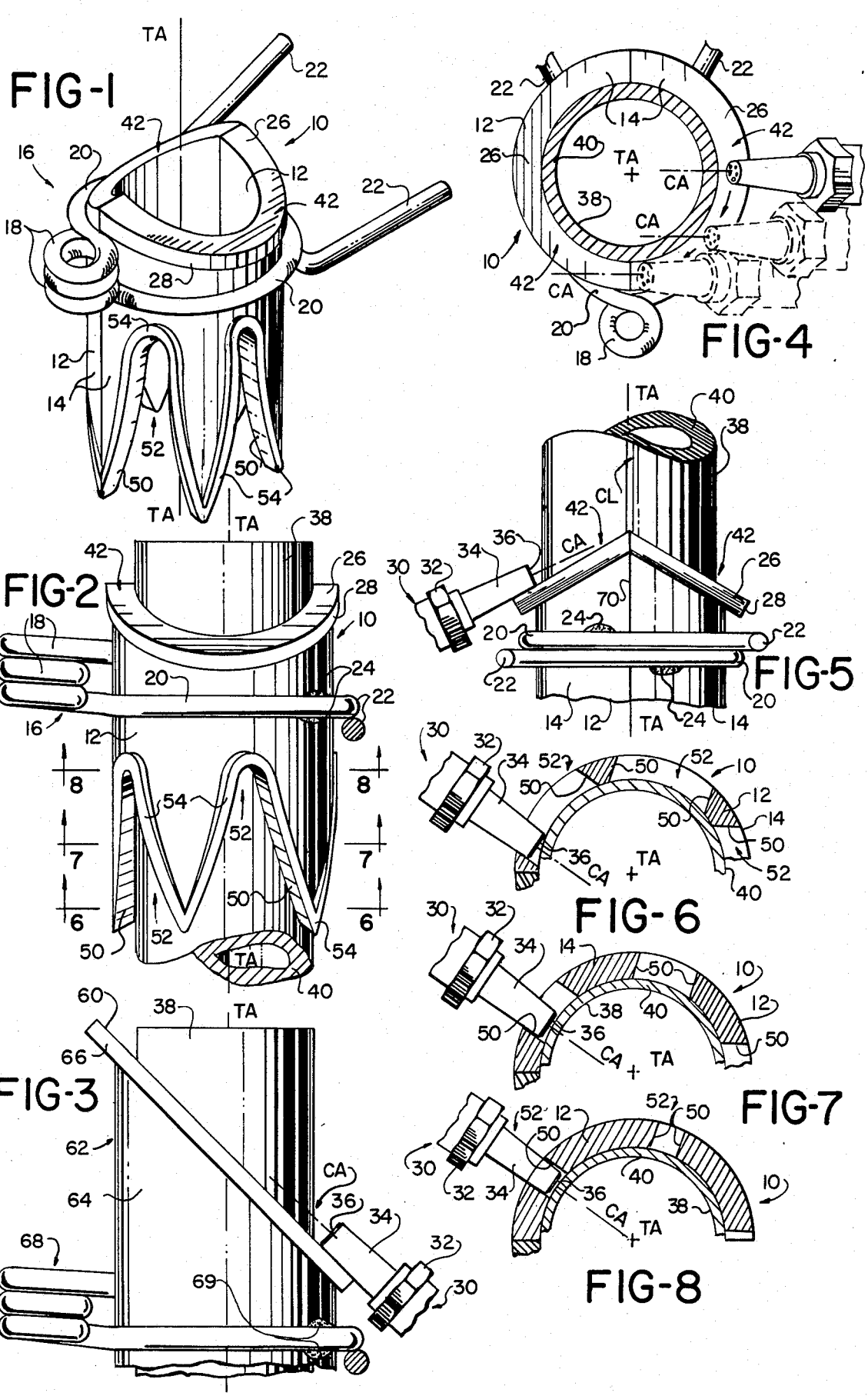

PIPE CUTTING TEMPLET

BACKGROUND OF THE INVENTION (1) Field of the Invention

This invention relates to templets for making pattern cuts in pipe with a torch. Applicant designates one with ordinary skill in the art to be a welder or other person skilled in cutting metal pipe with a gas fed torch.

(2) Description of the Prior Art

When joining lengths of pipe by welding it is often necessary to cut the ends to be joined in a specific pattern. One example is cutting 45 degree angles in pipe ends to be welded together to form an elblow or right angle joint. Another example, when a pipe length is to be welded mediate another pipe, such as for a tee or to interconnect parallel pipes of a framework, is to cut a saddle pattern in the pipe end. Still another example for closing an end of a pipe is to cut an orange peel pattern, bend the splayed ends inward, and welded the "peels" together.

Before my invention, workers in the art used plastic or steel templets for drawing the patterns on pipe with chalk, soapstone, grease pencil, or the like. While holding and guiding the torch entirely with the hands, the cutting tip was traced along the mark on the pipe. Inevitably, errors in marking and difficulty in manipulating the pipe and templet together frequently resulted in inaccurate cuts.

Users of prior art templets also had problems with the slag from the cut away metal collecting on the finished, retained workpiece. The slag had to be knocked off with a hammer or chisel. Additionally, to follow the pattern mark on the pipe, the torch was moved with the cutting axis or flame radial of the pipe, requiring frequent rotation of the workpiece.

Before filing this invention, a search was made in the United States Patent and Trademark Office, which search developed the following United States patents:

CARR, U.S. Pat. No. 1,683,953
GOTTWALD, U.S. Pat. No. 2,155,705
ENDERSON, U.S. Pat. No. 2,326,447
HOWARD, U.S. Pat. No. 2,408,517
LEE, 2,985,963
BRUNER, 4,381,854
RUSK, 4,414,041

Although these references do not appear to directly pertain to the invention, they are nevertheless cited because as the results of a search conducted by an experienced searcher, they might be regarded as relevant and pertinent to the examination of this application.

SUMMARY OF THE INVENTION (1) New Function and Surprising Results

My invention uses an extremely simple structure to permit one cutting the pipe to quickly and easily make extremely accurate cuts, without the requirement for transferring markings from a templet.

My invention uses a cylindrical tube, sleeve or collar, that is axially split into segments. The segments are biased toward each other in alignment by a spring attached thereto. Handles attached to the segments are squeezed to open or spread the segments to facilitate sliding or telescoping the templet over pipe to be cut.

The tube preferably has a pattern cut in both ends. A flat face defines the patterns, and is formed by the thickness of the tube wall, extended or widened by a flange coextensive with the pattern. A flat-sided collar of a torch, near the torch tip from which the flame is directed, is rested flush against the flat face of the templet, which orients the torch cutting axis at a desired angle to the workpiece.

The pattern is formed by the flat face such that the tube covers the parts of the pipe to be retained, and exposes those portions of the pipe to be cut away. For saddle cuts, the flat guide edge is preferably bevelled or angled with respect to the pipe wall so that the cutting torch is oriented toward the portions of the pipe to be cut away, thereby insuring that any slag resulting from cutting is directed away from the retained workpiece and into the discarded, cutaway portions. The slag is also directed away from the templet.

The templet may be treated or coated to reduce the likelihood or tendency of slag to adhere to the templet surfaces, although the preferred torch orientation makes this largely unnecessary.

It is far preferable to maintain the torch pointed in one direction instead of radially, as in prior art practice. This permits cutting a section of the pattern without rotating the workpiece. The torch operator starts by positioning the torch with the side of the collar flush against the flat face at a center of the pattern section being cut, with the torch cutting axis radial of the pipe and templet. The torch is moved along the flat face while maintaining the flat side of the collar flush against the flat face and maintaining the cutting axis parallel to that of the torch at the center position.

I also prefer to orient the pattern on the tube with respect to the split of the tube segments so that a centerline drawn on a pipe may be oriented precisely with the pattern by aligning the centerline with the split.

With the simple structure and method of my invention, pipe may be cut more quickly and more accurately with the templet on the pipe. Thus, the total function of my invention far exceeds the sum of the functions of the individual parts such as pipe, rods, springs, etc.

(2) Objects of this Invention

An object of this invention is to make accurate pattern cuts in pipe.

Further objects are to achieve the above with a device that is sturdy, compact, durable, lightweight, simple, safe, efficient, versatile, ecologically compatible, energy conserving, and reliable, yet inexpensive and easy to manufacture, and use.

Other objects are to achieve the above with a method that is versatile, ecologically compatible, energy conserving, rapid, efficient, and inexpensive, and does not require skilled people to perform.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is a perspective view of a templet according to my invention.

FIG. 2 is a side elevation view of the template shown in FIG. 1.

FIG. 3 is a side elevation view of another embodiment of a templet according to my invention.

FIG. 4 is a top view of the templet shown in FIG. 1.

FIG. 5 is a side elevation view of the saddle pattern of the templet shown in FIG. 2.

FIGS. 6, 7, and 8 are partial section views taken substantially along lines 6—6, 7—7, and 8—8, respectively, of FIG. 2.

FIGS. 3 through 8 also show the orientation of a torch according to the invention.

DESCRIPTION OF THE PREFERRED EMBODIMENTS

FIG. 1 shows a preferred embodiment of my invention, having a saddle and an orange peel pattern on opposite ends of the templet. The templet includes a tube 10 having a tube axis "TA" and tube walls 12. The tube 10 is preferably axially split into segments 14. Although the simple structure resulting from a split into halves, as shown in the drawings, is most preferred, the tube 10 could be split into more than two segments and still be within the scope of my invention. The templet maybe formed of steel, asbestos material or any other suitable heat resistant material.

Biasing means for biasing and maintaining the segments 14 together in alignment, is preferably in the form of biasing group 16, which includes spring coils 18, spring arms 20, and handles 22. The arms 20 flank or shift around the segments 14 from the coils 18 to opposite sides of the segments 14, where they are preferably attached at welds 24 on the segments 14. The welds 24 are distal from the spring coils 18 as feasible, and proximate the handles 22, to minimize any loss of spring strength because of heat transmitted to the spring coils. Although the handles remain relatively cool, the tube becomes quite warm during use.

As shown in the drawing, the welds 24 are proximate the split in the tube opposite the spring coils 18. The handles 22 are preferably attached at the welds 24, and then extended across the split of division of the tube to extend from the other segment 14. Thus, when squeezed together, the handles 22 will force the segments apart, or open.

The tube diameter is preferably selected so that the smallest expected pipe workpiece diameter will fit snugly within the tube. The spring strength is preferably selected to be strong enough to snugly engage the pipe workpiece within the tube, but not so strong as to require more than a modest squeeze of the handles to open the templet segments.

I prefer to make the biasing group 16 from a single rod of spring steel, and to precision wrap the spring coils 18 and weld the spring arms 20 in a specific orientation on the segments 14, so that the segments will be biased together in alignment regardless of their misalignment when the handles 22 are released.

Flat face 26 defines a saddle pattern at one end of the tube 10. As shown in FIGS. 1 through 5, the flat face 26 is preferably formed by the tube walls 14, and flanges 28 welded, or preferably molded, coextensive with the pattern defined or described by the flat face 26. Although the flange 28 is preferred in order to provide a sufficiently wide flat face 26, if the tube walls 14 are sufficiently thick, the flange may be omitted.

Torch 30 includes nozzle 32 having a substantially flat-sided, conical collar or shoulder 34 near tip 36. The nozzle 32 directs the inflammable gases from the tip 36 along cutting axis "CA". When ignited, the gases produce a cutting flame along the cutting axis. The collar 34 is rested, placed or positioned flush on the flat face 26, as shown in FIG. 5. When the torch is so aligned, the cutting axis is oriented at a desired angle to pipe wall 40 of pipe 38 being cut.

For clarity of the drawings, only the nozzle structure of the torch 30 has been shown. Those with ordinary skill in the art will be familiar with the structure of the various torches used in the art, and will know that almost any torch in commercial use by welders and pipe cutters will have structure similar to the nozzle 32 and collar 34 shown in the drawings. Based on this disclosure, anyone with ordinary skill in the art will be able to use the invention with almost any torch.

The flat face 26 includes two planar sections 42 that are symmetrical about a plane that includes the tube axis and divides the tube. Described yet another way, the flat face sections 42 are planar and the two planes containing the flat face sections 42 are equiangular to the tube axis, and intersect along a line that includes, and is normal to, the tube axis.

The flat face 26 is preferably angled to the tube wall 12 and the pipe wall 40 so that when a torch collar side is rested flush against the flat face 26, the cutting axis will be oriented at a desired angle to the pipe wall 40 to be cut. For the saddle pattern shown the torch is also oriented to direct any metal slag or spatter from the cutting operation away from the workpiece and the templet, and onto the portions of the pipe to be cut away.

The pipe is cut by positioning the torch collar side flush on the flat face, at the center of one of the flat face sections 42, with the cutting axis intersecting the tube axis (see FIG. 4), and then moving the torch collar along the flat face 26 while maintaining the collar side flush, and maintaining the cutting axis of the torch parallel to that of the torch at the center position of the flat face section 42. After the torch is moved to the outside of the flat face section 42, it is repositioned at the center, and moved in the opposite direction along the flat face 26, keeping the collar side flush and keeping the cutting axis parallel to that at the center position, until the entire segment 42 has been traced. The pipe, and templet thereon, are rotated 180 degrees, and the above steps are repeated for the other flat face segment 42 to finish cutting the saddle pattern.

Flat face 50 defines an orange peel pattern at the opposite end of the tube 10 from the flat face 26. The preferred orange peel pattern shown is divided into five sections 52, equally spaced about the circumference of the tube 10. The flat face 50 is formed by the tube wall 12 and flange 54 welded, or preferably molded, coextensive with the pattern and flat face 50, and protruding from the tube wall 12.

Instead of being bevelled or angled with respect to the pipe as disclosed for the saddle, the flat face 50 of each section 52 is parallel to a plane that includes the tube axis and a radius extending through the center of the respective section 52. Thus, as shown in FIGS. 6, 7, and 8, when cutting each section 52, the torch collar is placed on the flat face 50 at the center of the section 52 (FIG. 8), flush against the flat face 50. The torch is then moved to the right or left along the flat face 50 (FIGS. 7 and 6), while maintaining the collar side flush against the flat face 50 and maintaining the cutting axis parallel to the torch position at the section 52 center, or horizontal for the orientation shown in the drawings. Once the outside of the section 52 is reached with the nozzle, the nozzle is repositioned at the center of the pattern section 52, and moved in the other direction to finish cutting that section.

After rotating the pipe about 72 degrees, the above steps are repeated for the next section, and so on until the complete orange peel pattern has been cut.

Thus, when used in connection with my invention, the cutting torch is not moved radially about the pipe, and the pipe is not rotated while the cutting torch is moved along a guide or pattern, so that the welder or person cutting the pipe may simply stay in one place and move the torch along the guides in a consistent orientation. This makes the cutting job easier, and allows the nozzle to be more precisely moved along the flat faces and patterns.

A 45 degree angle pattern is shown on the templet end disclosed in FIG. 3. Flat face 60 is planar for the entire pattern, at a 45 degree angle to the tube axis of tube 62. As with the saddle pattern shown in FIGS. 1 and 2, the flat face 60 is formed by tube wall 64 and flange 66 welded, or preferably molded, to the tube wall coextensive with the flat face 60 and the pattern defined thereby. Biasing group 68 is preferably identical to that shown in FIGS. 1 and 2, and connected at welds 69.

The procedure for cutting the pipe 38 within the tube 62 is substantially the same as for the saddle pattern and face 26.

Referring to the drawings, it may be seen that the templet covers up and protects the portion of the pipe that is retained, whereas the portions of the pipe to be cut away are exposed. Thus, slag is more likely to be deposited on the outside of the cut away pieces of pipe than on the retained portions.

The embodiments shown also permit alignment of the templet and pattern on the pipe. A straight axial centerline is marked in chalk, soapstone, or grease pencil on the pipe to be cut. The handles 22 are squeezed to open the templet by separating the segments 14, and the tube 10 telescoped onto the pipe 38. The templet is then rotated until split 70 of the tube between the handles, or another convenient reference split if desired, is aligned with centerline "CL" on the pipe (FIG. 5). The appropriate pattern is then cut. If it is desired to align another pattern with the one already cut, the process is simply repeated. One example would be two saddle patterns cut in a pipe that is to extend between two parallel pipes of a framework. Another example would be two 45 degree cuts of a pipe to be welded at the top of a framework. This convenient alignment function of my invention facilitates building square frameworks.

Thus it may be seen that the simple structure of my invention facilitates quick and accurate cutting of pipes in desired patterns. The templet remains on the workpiece during cutting, and shields the retained portions of the workpiece from damage by the torch and from the accumulation of slag thereon. Surprisingly, my invention obtains these results with a simple, but extremely effective, structure for maintaining the cutting torch in a desired orientation to the workpiece or pipe.

The embodiment shown and described above is only exemplary. I do not claim to have invented all the parts, elements, or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing the following catalog of elements is provided:

CATALOG OF ELEMENTS 10 tube
12 tube wall
14 segments
16 biasing group
18 spring coils
20 spring arms
22 handles
24 welds
26 flat face—saddle
28 flange—saddle
30 torch
32 nozzle
34 collar
36 tip
38 pipe
40 pipe wall
42 flat face sections—saddle
50 flat face—orange peel
52 flat face sections—orange peel
54 flange
60 flat face—45 degree
62 tube
64 tube wall
66 flange
68 biasing group
69 welds
70 split

I claim as my invention:

1. A templet for use with
   (a) a metal pipe having an axis and a pipe wall, and
   (b) a cutting torch for directing combustible gases along a cutting axis from a tip of the torch,
   (c) the torch having a flat-sided collar proximate the tip,
   (d) the flat sides of the collar being aligned substantially parallel with the cutting axis;
   wherein the improved templet comprises:
   (e) a tube that telescopes around the pipe,
   (f) the tube having an axis and a cylindrical tube wall,
   (g) a desired axial pattern defined by a flat face transverse the tube wall at an end of the tube,
   (h) the tube wall substantially covering parts of the pipe to be retained proximate the flat face and exposing parts of the pipe to be cut away proximate the flat face, and
   (i) the flat face being angled to the tube wall so that when the flat side of the torch collar is positioned flush against the flat face, the cutting axis will be oriented at a desired angle to the tube wall.

2. The invention as defined in claim 1 including all of the limitations (a) through (i) with the addition of the following limitation:
   (j) said flat face being angled so that the torch tip points toward the parts of a pipe within the tube to be cut away.

3. The invention as defined in claim 1 including all of the limitations (a) through (i) with the addition of the following limitation:
   (j) a flange at the tube end, coextensive with the flat face, for extending the flat face beyond the thickness of the tube wall.

4. The invention as defined in claim 1 including all of the limitations (a) through (i) with the addition of the following limitation:
(j) surfaces of the tube being treated to reduce the tendency of metal spatter to adhere thereto.

5. The invention as defined in claim 1 including all of the limitations (a) through (i) with the addition of the following limitations:
(j) at least two segments forming the tube when in alignment,
(k) means attached to the tube for biasing the segments together in alignment,
(l) handles connected to the tube for spreading the segments apart when the handles are squeezed together.

6. The invention as defined in claim 5 including all of the limitations (a) through (l) with the addition of the following limitations:
(m) said means for biasing being in the form of a spring connecting the segments,
(n) said spring being wound so that the segments are selfaligning.

7. The invention as defined in claim 5 including all of the limitations (a) through (l) with the addition of the following limitation:
(m) the segments snugly clasping a pipe telescoped within the tube when the segments are aligned.

8. A process of cutting metal pipe having an axis and a pipe wall comprising:
(a) providing a cutting torch having a flat-sided collar proximate the tip,
(b) aligning the flat sides of the collar in a substantially parallel orientation to a desired cutting axis,
(c) telescoping a tube having a cylindrical tube wall over the pipe and
(d) adjusting the tube so that a desired axial pattern at one end of the tube is positioned as desired on the pipe,
(e) placing the flat side of the torch collar flush against a flat face defining the pattern, and being at a desired angle transverse of the tube wall, thus
(f) orienting the cutting axis at a desired angle to the tube wall,
(g) moving the torch collar along the flat face while
(h) maintaining the flat side of the torch collar flush on the flat face and
(i) cutting through the pipe wall along the cutting axis, thus
(j) cutting a desired axial pattern in the pipe at a desired angle through the pipe wall.

9. The invention as defined in claim 8 including all of the limitations (a) through (j) wherein the pattern at the tube end has at least one section, with the addition of the following limitations:
(k) before the placing step "(e)" above,
(l) positioning the torch tip at a center of the pattern segment to be cut with the cutting axis radial of the pipe,
(m) during the moving step "(g)" above,
(n) maintaining the cutting axis substantially parallel to the alignment of the cutting axis at the center of the pattern.

10. The invention as defined in claim 8 including all of the limitations (a) through (j) with the addition of the following limitations:
(k) the "telescoping" step "(c)" further comprising the steps of:
(l) squeezing handles attached to a pair of segments of the tube and
(m) spreading the segments apart at axial splits of the tube,
(n) sliding the spread apart tube over the pipe,
(o) releasing the handles and
(p) biasing the segments in axial alignment for
(q) snugly clasping the pipe; and
(r) the "adjusting" step "(d)" further comprising the steps of:
(s) determining a desired centerline of the pipe,
(t) rotating the tube above the pipe until one of the axial splits, in predetermined alignment with the pattern of the templet, is aligned with the centerline.

11. A templet for use with
(a) a metal pipe having an axis and a pipe wall, and
(b) a cutting torch for directing combustible gases along a cutting axis from a tip of the torch,
(c) the torch having a flat-sided collar proximate the tip,
(d) the flat sides of the collar being aligned substantially parallel with the cutting axis;
wherein the improved templet comprises:
(e) a tube having an axis and a cylindrical tube wall,
(f) the templet being axially split into two hemicylindrical segments,
(g) a spring attched to the segments for biasing the segments together in aligment,
(h) handles attached to the templet for manually spreading the segments apart, in opposition to the biasing action of the spring,
(i) the tube snugly clasping a pipe telescoped therein,
(j) a flat face transverse the tube wall defining a desired circumferential pattern at an end of the tube,
(k) the tube exposing parts of the pipe to be cut away proximate the flat face and substantially covering parts of the pipe proximate the flat face to be retained.

12. The invention as defined in claim 11 including all of the limitations (a) through (k) with the addition of the following limitation:
(l) said spring being wound so that the templet corrects misalignment of the segments.

13. The invention as defined in claim 11 including all of the limitations (a) through (k) with the addition of the following limitations:
(l) said desired pattern being a 45 degree cut, wherein
(m) the flat face is planar and
(n) the flat face is angled at 45 degrees to the tube axis.

14. The invention as defined in cliam 11 including all of the limitations (a) through (k) with the addition of the following limitations:
(l) said desired pattern being a saddle, wherein
(m) the flat face has two planar halves, the face halves are symmetrical about a plane that includes the tube axis.

15. The invention as defined in claim 11 including all of the limitations (a) through (k) with the addition of the following limitations:
(l) said desired pattern being an orange peel, wherein
(m) the flat face of the templet describes multiple pattern sections, and
(n) the flat face of each section is normal to a reference plane, where
(o) the reference plane is normal to a radius of the tube extending through a center of each section.

* * * * *

UNITED STATES PATENT AND TRADEMARK OFFICE
CERTIFICATE OF CORRECTION

PATENT NO. : 4,618,378
DATED : October 21, 1986
INVENTOR(S) : James E. Huckaby

It is certified that error appears in the above-identified patent and that said Letters Patent is hereby corrected as shown below:

On the Title Page, Item [73] Assignee: "Shuf-Kut, Inc.,"
should read -- Shur-Kut, Inc. --

Signed and Sealed this

Tenth Day of February, 1987

Attest:

DONALD J. QUIGG

*Attesting Officer*  *Commissioner of Patents and Trademarks*